(12) United States Patent
Ramachandran et al.

(10) Patent No.: US 8,806,012 B2
(45) Date of Patent: Aug. 12, 2014

(54) MANAGING TRAFFIC FLOW ON A NETWORK PATH

(75) Inventors: Lakshmi Ramachandran, Karnataka (IN); Farid Adrangi, Lake Oswego, OR (US); Manish Nair, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 2172 days.

(21) Appl. No.: 11/394,832

(22) Filed: Mar. 31, 2006

(65) Prior Publication Data

US 2007/0233895 A1    Oct. 4, 2007

(51) Int. Cl.
*G06F 15/173* (2006.01)
*H04L 12/26* (2006.01)
*H04J 3/16* (2006.01)

(52) U.S. Cl.
USPC ........... 709/226; 709/231; 709/234; 709/227; 370/230; 370/468

(58) Field of Classification Search
CPC .............. H04L 29/08144; H04L 29/06; H04L 29/08072; H04L 29/08171; H04L 12/5695
USPC .......................................................... 709/226
See application file for complete search history.

(56) References Cited

U.S. PATENT DOCUMENTS

| | | | | |
|---|---|---|---|---|
| 5,544,327 | A  * | 8/1996 | Dan et al. ...................... | 709/234 |
| 6,768,716 | B1 * | 7/2004 | Abel et al. ..................... | 370/230 |
| 7,324,555 | B1 * | 1/2008 | Chen et al. ..................... | 370/468 |
| 2002/0099829 | A1 * | 7/2002 | Richards et al. .............. | 709/227 |
| 2002/0161911 | A1 * | 10/2002 | Pinckney et al. ............. | 709/231 |

* cited by examiner

*Primary Examiner* — David Lazaro
*Assistant Examiner* — Mahran Abu Roumi
(74) *Attorney, Agent, or Firm* — Barnes & Thornburg, LLP

(57) ABSTRACT

A network device determines the traffic specification values based on the session values that represent the application parameters of an application, which is provided differentiated service levels. A user of the network device may provide and/or choose the session values. The network device may generate one or more streams corresponding to a plurality of the applications. Each stream may comprise one or more traffic instances. The network device may assign a priority value to each stream and instance identifier to each traffic instances within the stream to manage the transfer of data units.

16 Claims, 5 Drawing Sheets

MANAGING TRAFFIC FLOW ON A NETWORK PATH

BACKGROUND

A computer network generally refers to a group of interconnected network devices that may exchange data and/or share the resources. An example of a network device may be a laptop computer, a desktop computer, a hand held device, a mobile phone, a server, a fax machine, a printer, a router, and/or a switch. The network devices may support collaboration applications, which enable users to share information by supporting audio, video, scheduling, calendaring, integrated messaging, whiteboard conferencing, document editing, and such other applications.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes managing traffic flow of applications with quality of service (QoS) concerns such as collaboration applications and multimedia applications. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
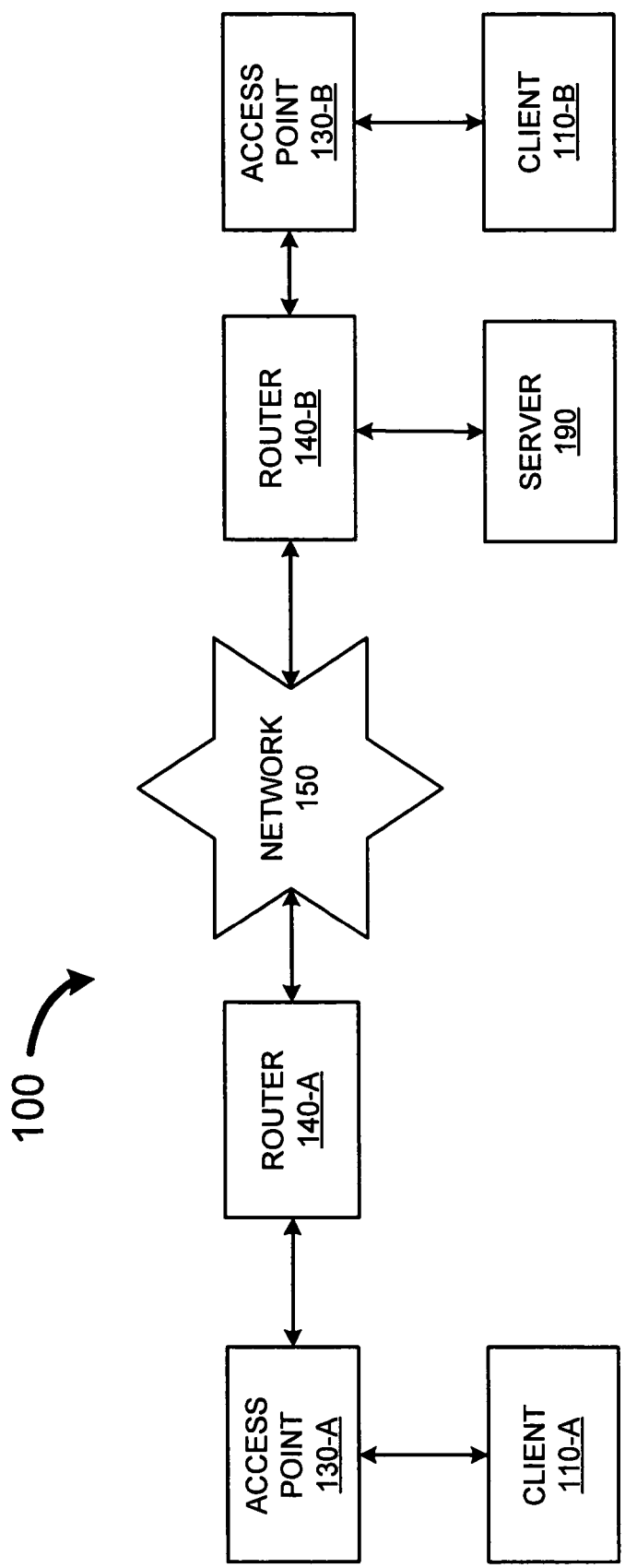
FIG. 1 illustrates an embodiment of a network environment.

An embodiment of a network environment 100 is illustrated in FIG. 1. The network environment 100 may comprise one or more network devices such as a client 110, an access point 130, a router 140, and a server 190. The network devices may be coupled to a network 150. For illustration, the network environment 100 is shown comprising a small number of each type of such network devices. However, a typical network environment may comprise a large number of each type of such network devices.

The clients 110-A and 110-B may comprise a computing device. In one embodiment, the computing device may, also, share data units or communicate with other devices. The clients 110 may represent systems such as a desktop or a laptop computer or a hand held device or a mobile phone that may comprises various components to process, send and/or receive data packets. In one embodiment, the user of client 110-A may share a presentation with a user of the client 110-B. In one embodiment, the clients 110-A and 110-B may, respectively, couple, using a wireless LAN (WLAN) or any other wired or wireless medium, to the access points 130-A and 130-B.

In one embodiment, the clients 110-A and 110-B may comprise wireless local area network (WLAN) components to send and receive radio signals over a wireless medium. The clients 110-A and 110-B may access the server 190 as well. In one embodiment, the clients 110-A and 110-B may comprise Intel® Centrino® based platform that may support wired and wireless connectivity to enable the clients 110-A and 110-B to communicate with other network devices. The clients 110-A and 110-B may, for example, support protocol suites such as hyper text transfer protocol (HTTP), file transfer protocols (FTP), transmission control protocol/internet protocol (TCP/IP), IEEE standard 802.11™ protocol suites and such other protocols.

In one embodiment, the clients 110-A and 110-B may support, for example, multimedia or collaboration applications, that enable the clients 110-A and 110-B to send and receive audio, video, data, and signaling packets and such other data units. In one embodiment, the video application supported by the client 110-A may generate one or more streams. Each stream may in turn comprise one or more traffic instances. For example, the video application may generate data units, which correspond to a video conferencing stream, video-on-demand stream and such other streams. The video conferencing stream may, for example, comprise various traffic instances such as an audio traffic, video traffic, and signaling traffic. In one embodiment, the client 110-A may assign a priority value to each stream and may assign instance identifiers to each traffic instances.

In one embodiment, the client 110-A may support graphic user interfaces that a user, for example, may use to provide one or more session values corresponding to application parameters of the streams. In one embodiment, the client 110-A may determine traffic specification values based on the session values. In one embodiment, the collaboration applications supported by the client 110-A may cause quality of service (QoS) reservations on the network path based on the traffic specification values.

In one embodiment, the network path between the clients 110-A and 110-B may represent a wireless link. In one embodiment, the QoS reservations may ensure reservation of appropriate bandwidths, to one or more traffic instances within each stream, on the radio links. The traffic instances may comprise one or more packets generated by the collaboration applications that may be sensitive to packet delays.

The access points 130-A and 130-B may act as a communication hub for bridging wired and wireless network. In one embodiment, the access points 130-A and 130-B may comprise one or more components that together may support users of the clients 110-A and 110-B to connect to the network 150. In one embodiment, the access points 130-A and 130-B may comprise modules such as wireless local area network (WLAN) components to support receiving and sending of radio signals to the clients 110-A and 110-B. In one embodiment, the access points 130-A and 130-B may support QoS reservations, caused by the clients 110-A and 110-B, on the network path.

The access points 130-A and 130-B may couple to the wireless network comprising clients 110-A and 110-B with the wired network comprising network devices such as routers 140-A and 140-B. The access points 130-A and 130-B may support creation and deletion of one or more traffic instances based on the data received from the client 110. In one embodiment, the access point 130-A may receive packets from the client 110-A over a radio link based on the QoS reservations. The access point 130-A may then send the received packets to the router 140-A over a wired link. Also, the packets received from the router 140-A over a wired link may be transferred to the client 110-A over a wireless link. The access point 130-A may support protocol suites such as IEEE standard 802.11™ and TCP/IP.

The routers 140-A and 140-B may enable transfer of data units between the clients 110-A and 110-B via the network 150. For example, the router 140-A after receiving a packet from the access point 130-A may determine a next router provisioned in a path to the client 110-B and forward a packet to the next router. Also, a packet received from the network 150 may be forwarded to the access point 130-A. The router 140-A may determine the next router based on the routing table entries, which may comprise address prefixes and port identifiers.

The server 190 may comprise a computer system capable of generating a response corresponding to a request received from other network devices such as the clients 110-A and 110-B and sending the responses to the clients 110-A and 110-B. The server 190 may be coupled to the network 150 via LAN or any wired or wireless network comprising network devices such as the router 140-B. The server 190 may comprise a web server, a transaction server, a database server, or any such server systems.

The network 150 may comprise one or more intermediate devices such as switches and routers, which may receive, process, and send the packets to an appropriate network device. The network 150 may enable a network device such as the clients 110-A and 110-B and the server 190 to transmit and receive data. The intermediate network devices of the network 150 may be configured to support various protocols such as TCP/IP.

Figure 2:
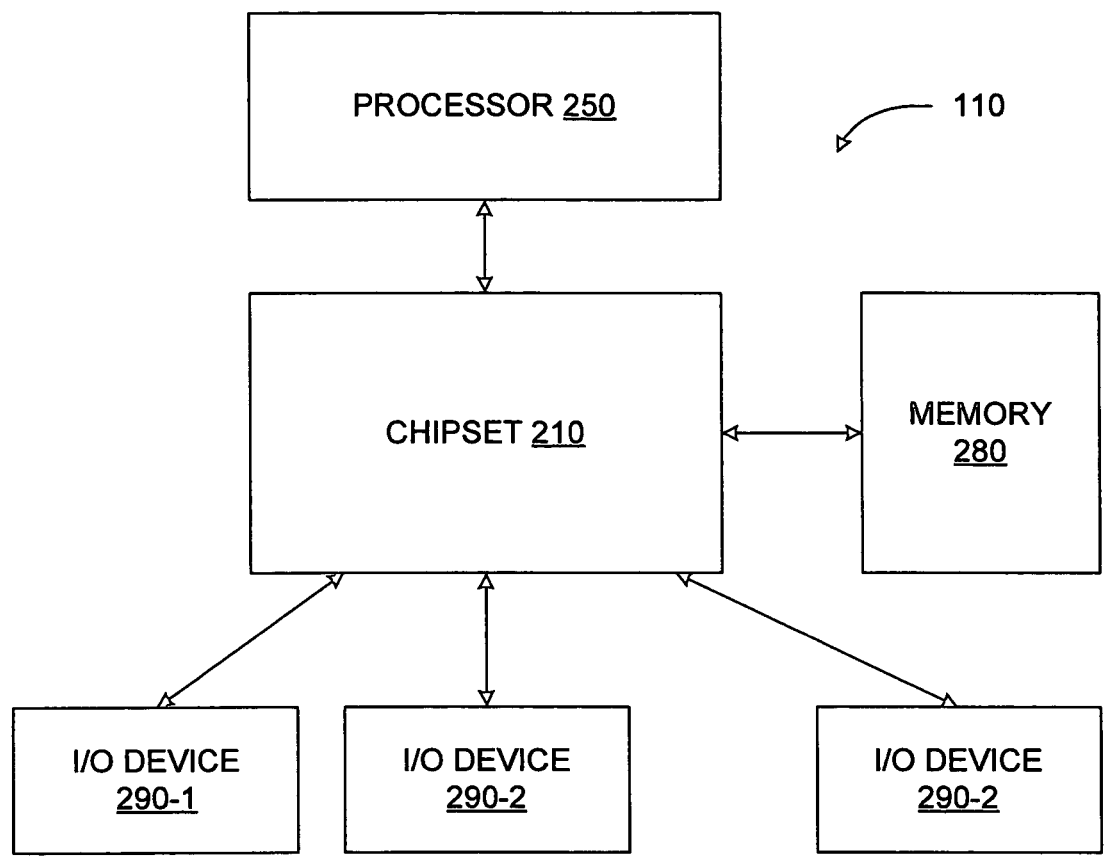
FIG. 2 illustrates an embodiment of a network device of the network environment of FIG. 1.

An embodiment of the client 110 is illustrated in FIG. 2. The client 110 may comprise a chipset 210, a processor 250, a memory 280, and I/O devices 290-A to 290-K.

The chipset 210 may comprise one or more integrated circuits or chips that operatively couple the processor 250, the memory 280, and the I/O devices 290. In one embodiment, the chipset 210 may comprise controller hubs such as a memory controller hub and an I/O controller hub to, respectively, couple with the memory 280 and the I/O devices 290. The chipset 210 may receive packets corresponding to a transaction generated by the I/O devices 290 on links such as the PCI Express links and may forward the packets to the memory 280 and/or the processor 250. Also, the chipset 210 may generate and may transmit transactions to the memory 280 and the I/O devices 290 on behalf of the processor 250.

The memory 280 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in the computing devices such as the client 110. The memory 280 may store one or more packets and packet related data that may be used by the processor 250. In one embodiment, the memory 280 may store packets and session values or profiles corresponding to, for example, audio, video, data, and signaling data streams. Also, the memory 280 may store traffic specification values such as a data rate and a packet size.

The processor 250 may manage various resources and processes within the client 110 and may execute software instructions as well. The processor 250 may comprise, for example, one or more microprocessors from the Pentium®, Itanium®, or XScale™ family of Intel® microprocessors. The processor 250 may interface with the chipset 210 to transfer data to the memory 280 and the I/O devices 290.

In one embodiment, the processor 250 may process data corresponding to one or more applications such as audio, video, and data applications. The processor 250 may support a graphic user interface (GUI) that may enable a user of the client 110 to provide the session values corresponding to the collaboration applications. In one embodiment, the GUI may display a list of application parameters and possible values that may be assigned to each application parameter. The user may select a session value from the list of the possible values for each application parameter. A group of such session values, provided by the user using a GUI that corresponds to the stream may be referred to as a profile. In one embodiment, the session values may represent QoS values corresponding to the collaboration applications. A set of session values representing QoS values of a stream of a video application may be referred to as a 'video QoS profile'.

In one embodiment, the video QoS profile may comprise the session values that correspond to application parameters such as a usage model, a codec type, a frame rate, pixels per frame, a color depth, and a content type. For example, a video application may create packets corresponding to one or more video streams. The processor 250 may receive session values corresponding to each stream and determine the traffic specification values. The client 110 may then send the packets over a network path based on the traffic specification values.

Figure 3:
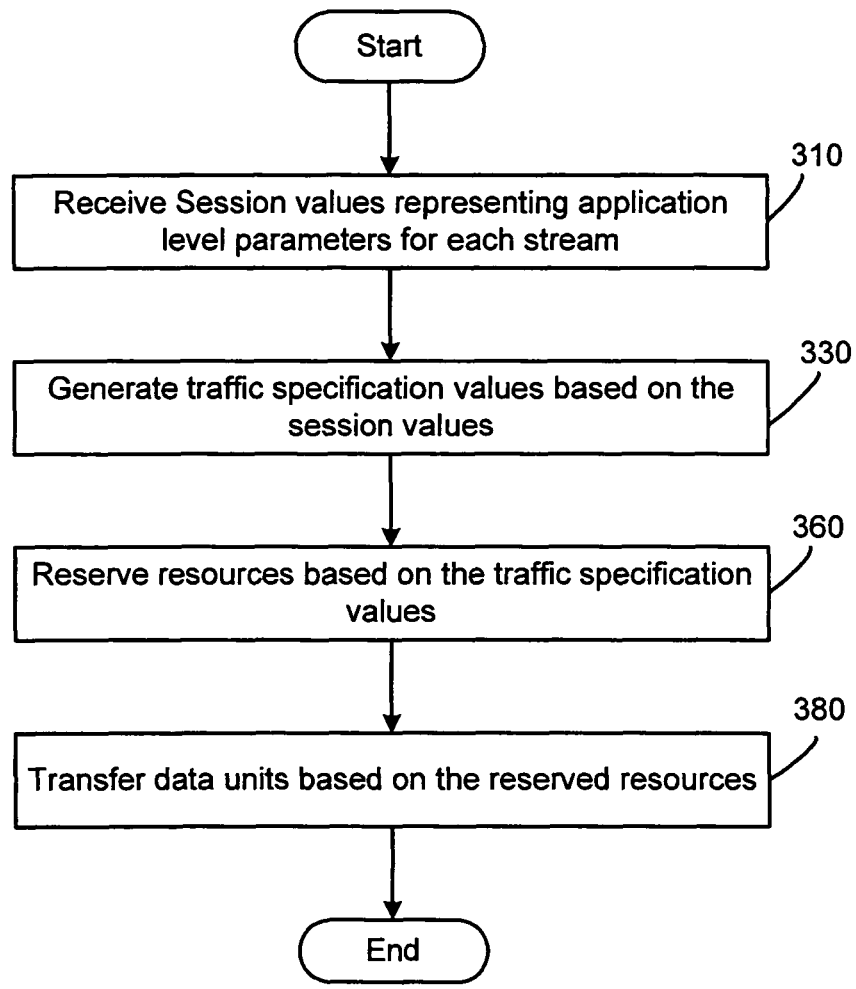
FIG. 3 illustrates an embodiment of an operation of the network device of FIG. 1

An embodiment of the operation of the client 110 supporting the collaboration applications that manage the QoS of the traffic instances of each stream is described in FIG. 3.

In block 310, the processor 250 may receive the session values representing the application parameters corresponding to each stream. For example, the processor 250 may receive session values corresponding to a video conferencing stream and the video conferencing QoS profile may comprise video conferencing, H.263, 30 frames/sec, (352*288) pixels per frame, 1 byte, and slow moving, which respectively correspond to the usage model, the codec type, the frame rate, the pixels per frame, the color depth, and the content type. In one embodiment, content of the video may change at a specific rate and based on the rate at which the content changes, the content type may be set to either slow moving, fast moving, and medium moving. In one embodiment, the content type may be set to slow moving if the mean data rate is less than or equal to 90 kilobytes per second (Kbps) for a mean packet size equaling 450 bytes. For example, the mean data rate of a TV talk show may be of slow moving type.

For example, the processor 250 may receive the session values representing a QoS profile of a MPEG stream. In one embodiment, the MPEG video QoS profile may comprise values such as MPEG 4 video streaming, H.263, 25 frames/sec, (128*96) pixels per frame, 1 byte, and slow moving, which respectively correspond to the frame rate, the pixels per frame, the color depth, and the content type respectively. The processor 250 may receive the session values representing a QoS profile of a data stream generated by a data application. In one embodiment, the data QoS profile may comprise the session values such as 'a file transfer' and 'a plain data' corresponding to the usage model and the content type. The processor 250 may receive the session values corresponding to a signaling stream of a signaling application. In one embodiment, the signaling QoS profile may comprise the session values such as 'a H.323', or 'SIP'.

In block 330, the processor 250 may determine the traffic specification values based on the session values. In one embodiment, the processor 250 may determine traffic specification values such as the data rate and the packet size using the session values.

In one embodiment, the traffic specification values, in addition to data rate and packet size values, may comprise values that cause traffic management of the streams based on the QoS profiles. In one embodiment, the processor 250 may generate flow creation, flow identification, and flow deletion values corresponding to the streams and the traffic instances. In one embodiment, the processor 250 may provide priority value to each stream and an instance identifier value to each traffic instance within the stream. In one embodiment, the processor 250 may cause deletion of traffic instances, between the client 110 and the access point 130, based on the flow deletion values.

In block 360, the processor 250 may cause the resources to be reserved, to traffic instances of the streams, on the network path between the client 110 and the access point 130 based on the traffic specification values. In one embodiment, the processor 250 may cause an appropriate amount of bandwidth to be reserved to transfer packets of size equaling the packet size at the data rate. In other words, the QoS profiles provided by the collaboration applications cause the QoS reservations on the network path.

In block 380, the processor 250 may cause transferring the packets based on the reserved resources such as the bandwidth. In one embodiment, the processor 250 may allow a network interface card supported by one of the I/O devices 290 to transfer the packets.

Figure 4:
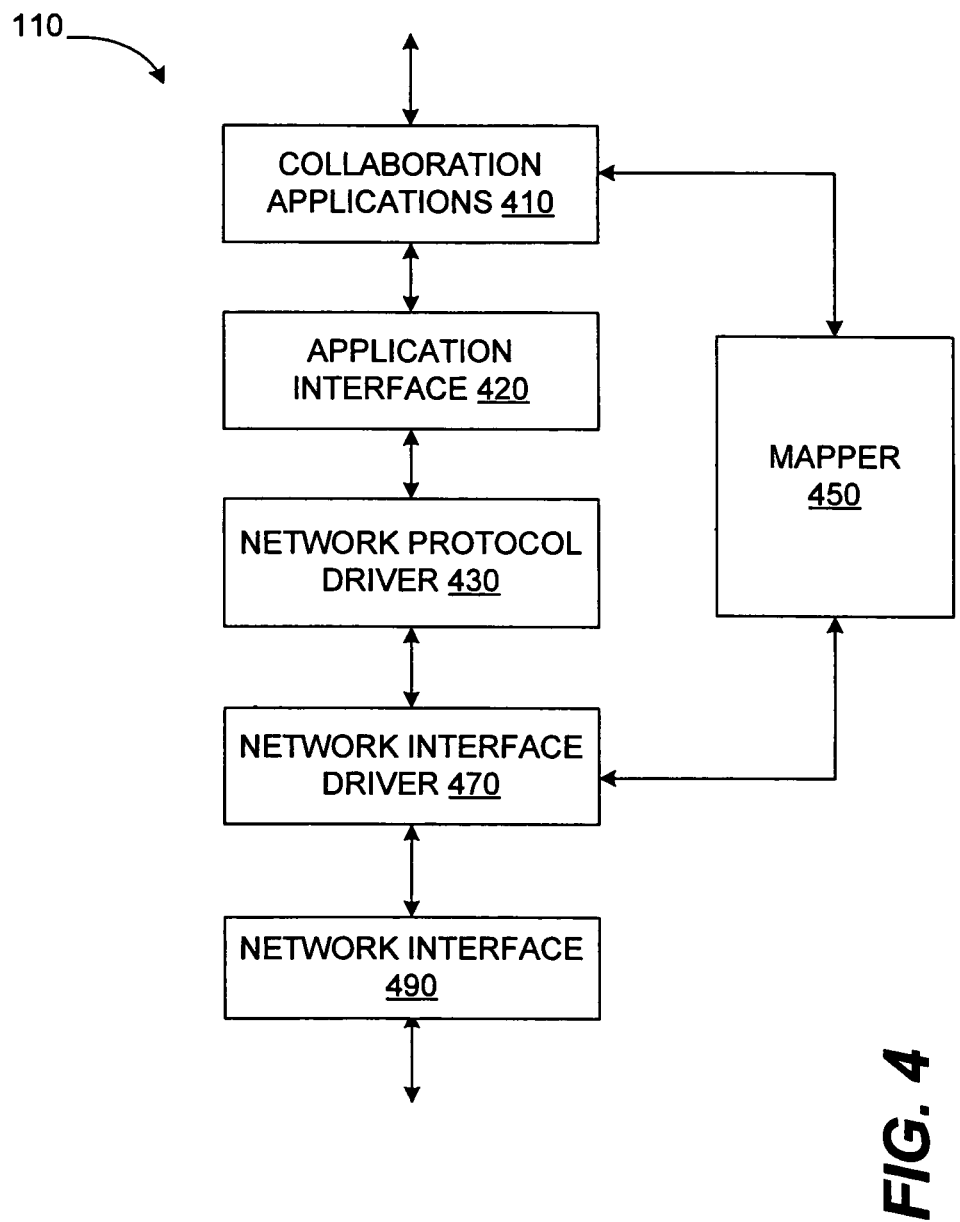
FIG. 4 illustrates an embodiment of a components model of the network device of FIG. 1.

An embodiment depicting a components model of the client 110 is illustrated in FIG. 4. In one embodiment, the client 110 may comprise components such as a collaboration application 410, an application interface 420, network protocol driver 430, a mapper 450, a network interface driver 470, and a network interface 490.

The collaboration application 410 may generate one or more streams corresponding to an audio, a video, and/or a data application. In one embodiment, the collaboration application 410 may encode and/or compress the data units of the streams generated by, for example, a net meeting session, video conferencing session, audio conferencing session, and such other sessions. The collaboration application 410 may then send the streams to the application interface 420. In one embodiment, the collaboration application 410 may receive one or more session values corresponding to the streams generated by the applications. The collaboration application 410 may then send the session values to the mapper 450.

The application interface 420 may establish sessions between the collaboration application 410 and the network protocol driver 430. In one embodiment, the application interface 420 may support sockets that establish communication between the collaboration application 410 and the network protocol driver 430.

The network protocol driver 430 may implement a network protocol stack such as IPX/SPX or TCP/IP and may provide services to the network interface cards coupled to the network interface 490. The network protocol driver 430 may provide services to the collaboration application 410. In one embodiment, the network protocol driver 430 may receive the streams from the application interface 420 and process the data units of the streams, for example, by adding a TCP/IP header. The network protocol driver 430 may remove the TCP/IP headers of the packets received from a network interface driver 470 and may send the data units over a specific communication channel or a socket. The network protocol driver 430 may comprise look-up tables comprising mapping information that may map the packets to the sockets.

The network interface driver 470 may cause resource reservations, on the network path, to the packets of each stream based on the traffic specification values. In one embodiment, the network interface driver 470 may receive traffic specification values such as the data rate, the packet size, the priority values, and the instance identifiers, which respectively correspond to the traffic instances in each stream. The network interface driver 430 may then receive packets corresponding to the traffic instances from each stream and may send the packets onward by assigning priority values to each stream and the instance identifier values to the traffic instances.

In one embodiment, the network interface driver 470 may cause packets comprising the data rate and the packet size values to be sent to the access points 130 prior to transferring the packets in each traffic instance over the network path. The network interface driver 470 may also cause packets comprising instance identifiers to be sent to the access points 130, after receiving, for example, an end of session message form the collaboration application 410. The client 110 and the access point 130 may delete the traffic instances indicated by the instance identifiers. The network interface driver 437 may also perform protocol translations, for example, from LAN protocol to ATM protocol, MAC address translations, and such other operations.

The network interface 490 may comprise, for example, a WLAN network interface card that may operate under the control of the network interface driver 470. In one embodiment, the network interface 490 may comprise hardware components that may transfer the streams based on the control values received from the network interface driver 470. The network interface 490 may support direct spread spectrum sequence (DSSS), frequency hopping spread spectrum (FHSS), base-band signaling, broad-band signaling and such other techniques.

The mapper 450 may provide traffic specification values to the network interface driver 470 to reserve resources on the network path between the client 110 and the access point 130. In one embodiment, mapper 450 may receive session values provided by the collaboration applications 410, create profiles based on the session values, and store the profiles. In one embodiment, the mapper 450 may generate the traffic specification values based on the profiles. In one embodiment, the traffic specification values may comprise the data rate, the packet size, the priority values and the instance identifiers. The traffic specification values may be provided to the network interface driver 470.

In one embodiment, the mapper 450 may provide the priority values and the instance identifier values using bits B17-B23 of the "Reserved" sub-field of the "TSInfo" field described in section "7.3.2.28-TSPEC element" of an IEEE document titled "IEEE Std 802.11e-2005 (Amendment to IEEE Std 802.11, 1999 Edition (Reaff 2003)): IEEE Standard for Information technology-Telecommunications and information exchange between systems-Local and metropolitan area networks-Specific requirements: Part 11: Wireless LAN Medium Access Control (MAC) and Physical Layer (PHY) specifications: Amendment 8: Medium Access Control (MAC) Quality of Service Enhancements".

In one embodiment, the mapper 450 may configure bits B21-B23 to a pre-determined logic level that represent the priority values to be associated with each stream. For example, the mapper 450 may assign a highest priority to a data sharing stream, by storing 000 in the bits B21-B23 respectively, and a lowest priority to a video streaming signaling stream, by storing 111 in the bits B21-B23 respectively. The mapper 450 may assign priority values to the video conferencing stream, the audio signaling stream, the video conferencing signaling stream, the data sharing signaling stream, and the video streaming stream using bits B21-23.

In one embodiment, the mapper 450 may configure bits B17-B20 of the "Reserved" sub-field to provide the instance identifier to the traffic instances within each stream. The mapper 450 may send control packets comprising the priority and the instance identifier values, respectively, configured with the bits B21-23 and B17-20 of the TSInfo field to the network interface driver 470.

In one embodiment, the mapper 450 may generate messages to delete one or more traffic instances and the corresponding messages may be sent to the network interface drive 470. For example, the mapper 450 may send a DELTS message described in the above identified IEEE document. The DELTS message to delete one or more traffic instances may comprise, for example, the instance identifier of the traffic instance that may be deleted. In one embodiment, the DELTS frame format is described in section "7.4.2.3: DELTS frame format" of the above mentioned IEEE document. The DELTS message may comprise a "Category field", "Action Field", "TSInfo Field", and "Reason Code Field".

The "Category Field" may be set equal to 1 to represent QoS and "Action Field", may be set equal to 2 to represent that the message is a DELTS message. The "TSInfo Field" may be stored with an instance identifier corresponding to a traffic flow that may need to be deleted. The "Reason Code Field" may be configured to indicate the reason that caused generation of disassociation or teardown message and the possible values corresponding to the reason is described in further detail in section "7.3.1.7: Reason Code Field" of the above identified IEEE document.

Figure 5:
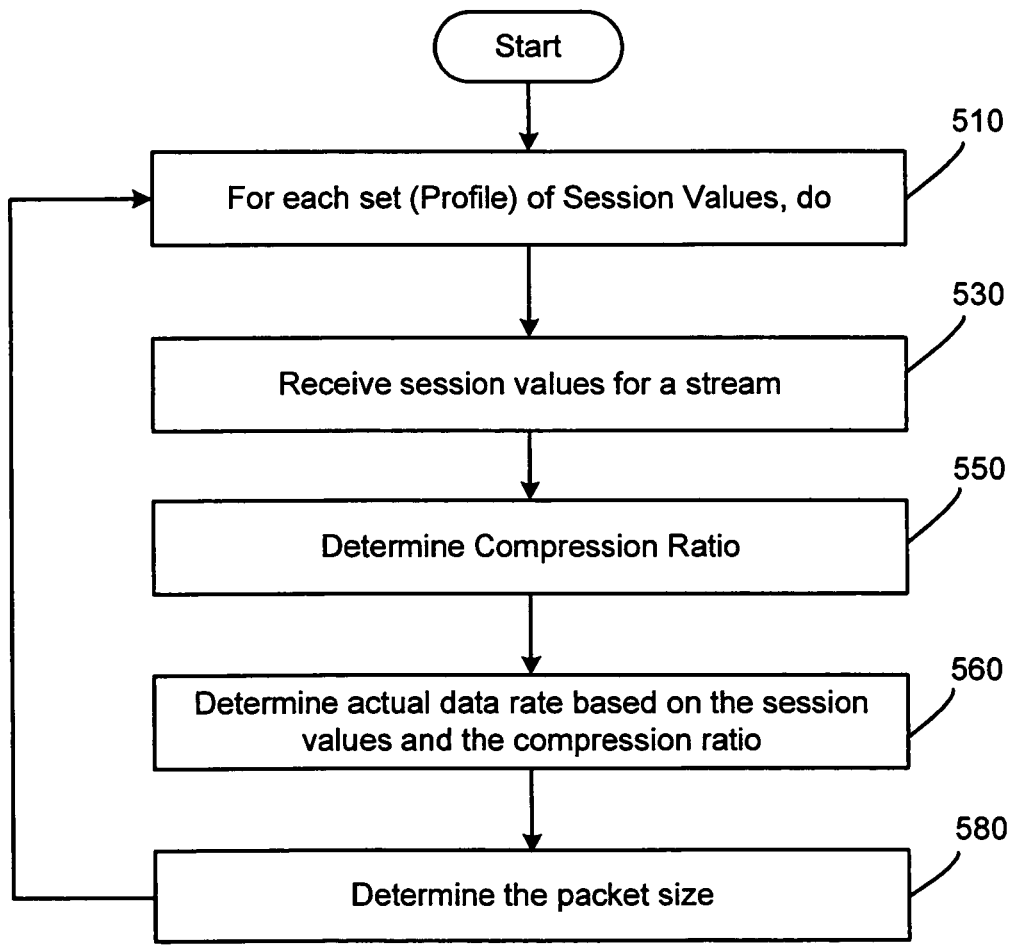
FIG. 5 illustrates an embodiment of the network device determining the traffic specification parameters based on the session values.

An embodiment of the mapper 450 determining the resource reservation values is described in FIG. 5. In block 510, the mapper 450 performs the operations in blocks 520-580 for each set of session values or profiles.

In block 530, the mapper 450 may receive session values for each stream. For example, a video QoS profile may comprise values such as video conferencing as the usage model; H.263 type as the codec type; 30 fps as the frame rate; (352*288) pixels/frame as the pixels per frame or the resolution; 1 byte/pixel as the color depth; and Slow moving as the content type.

In block 550, the mapper 450 may determine the compression ratio (CR) based on the experimental values corresponding to a codec type. In one embodiment, the mapper 450 may determine the experimental data for a H.323 codec type and pre-determined values of resolution, frame rate, and color depth. In one embodiment, the experimental data for a specific codec type may be available from the designers of such codec types. The mapper 450 may use the experimental data to determine an experimental data rate. The mapper 450 may then use the experimental data rate to determine the compression rate and the compression rate so determined may be used to determine the actual data rate for other combinations of the session values. In one embodiment, the mapper 450 may determine the compression ratio as equal to (pre-determined value of pixels per frame×pre-determined value of color depth×pre-determined value of frame rate)/experimental data rate, wherein 'x' and '/' respectively represent a multiplication and a division operator.

In block 560, the mapper 450 may determine the actual data rate as equal to (pixels per frame×color depth×frame rate)/compression ratio.

In block 580, the mapper 450 may determine the packet size as equal to actual date rate/frame rate, wherein "/" represents a division operator. In one embodiment, the mapper 450 may determine the values of the actual data rate and the packet size and send the values to the network interface driver 470.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method for supporting multimedia applications on a computing device, the method comprising:
   receiving session values for one or more application level parameters of a video stream generated by an application to which differentiated services are provided, wherein the session values define a codec type, the frame rate, a resolution, a color depth, and a content type of the video stream;
   determining, by a mapper component, an experimental data rate value based on experimental data available for a pre-determined codec type operating at a specific frame rate, resolution, and color depth;
   determining, by the mapper component, a compression ratio based on the experimental data rate value;
   determining, by the mapper component, an actual data rate value based on the compression ratio and the session values of the video stream defining the codec type, the frame rate, the resolution, the color depth, and the content type of the video stream;

determining, by the mapper component, a packet size value based on the actual data rate value and the frame rate;

receiving, by a network interface driver component, the actual data rate value and the packet size value; and reserving, by the network interface driver component, an amount of network bandwidth of a network path to transfer data units of the video stream on the network path, wherein the amount of bandwidth reserved is determined based on the actual data rate value and the packet size value.

2. The method of claim 1, wherein the video stream comprises one or more traffic instances; and further comprising:

assigning a priority value to the video stream; and assigning an instance identifier to each traffic instance of the one or more traffic instances.

3. The method of claim 2, wherein the instance identifier assigned to each traffic instance distinguishes each traffic instance from other traffic instances of the video stream; and wherein the priority value assigned to the video stream is indicative of a relative priority level associated with the video stream.

4. The method of claim 1, wherein reserving the amount network bandwidth comprises sending the actual data rate value and the packet size value over the network path to allocate the amount of network bandwidth before sending one or more data units of size equaling the packet size value at the actual data rate value.

5. A non-transitory machine-readable medium comprising a plurality of instructions that in response to being executed result in a computing device:

receiving session values for one or more application level parameters of a video stream generated by an application, in a client system, to which differentiated services are provided, wherein the session values define a codec type, the frame rate, a resolution, a color depth, and a content type of the video stream;

determining, by a mapper component, an experimental data rate value based on experimental data available for a pre-determined codec type operating at a specific frame rate, resolution, and color depth;

determining, by the mapper component, a compression ratio based on the experimental data rate value;

determining, by the mapper component, an actual data rate value based on the compression ratio and the session values of the video stream defining the codec type, the frame rate, the resolution, the color depth, and the content type of the video stream;

determining, by the mapper component, a packet size value based on the actual data rate value and the frame rate;

receiving, by a network interface driver component, the actual data rate value and the packet size value; and reserving, by the network interface driver component, an amount of network bandwidth of a network path to transfer data units of the video stream on the network path, wherein the amount of bandwidth reserved is determined based on the actual data rate value and the packet size value.

6. The non-transitory machine-readable medium of claim 5, wherein the video stream comprises one or more traffic instances; and wherein the plurality of instructions further result in the computing device (i) assigning a priority value to the video stream and (ii) assigning an instance identifier to each traffic instance of the one or more traffic instances.

7. The non-transitory machine-readable medium of claim 6, wherein the instance identifier assigned to each traffic instance distinguishes each traffic instance from other traffic instances of the video stream; and wherein the priority value assigned to the video stream is indicative of a relative priority level associated with the video stream.

8. The non-transitory machine-readable medium of claim 5, wherein reserving the amount network bandwidth comprises sending the actual data rate value and the packet size value over the network path to allocate the amount of network bandwidth before sending one or more data units of size equaling the packet size value at the actual data rate value.

9. An apparatus comprising:

a processor to:

receive session values for one or more application level parameters of a video stream generated by an application to which differentiated services are provided, wherein the session values define a codec type, the frame rate, a resolution, a color depth, and a content type of the video stream;

determine an experimental data rate value based on experimental data available for a pre-determined codec type operating at a specific frame rate, resolution, and color depth;

determine a compression ratio based on the experimental data rate value;

determine an actual data rate value based on the compression ratio and the session values of the video stream defining the codec type, the frame rate, the resolution, the color depth, and the content type of the video stream;

determine a packet size value based on the actual data rate value and the frame rate; and reserve an amount of network bandwidth of a network path to transfer data units of the video stream on the network path, wherein the amount of bandwidth reserved is determined based on the actual data rate value and the packet size value.

10. The apparatus of claim 9, wherein the video stream comprises one or more traffic instances; and wherein the processor is further to (i) assign a priority value to the video stream and (ii) assign an instance identifier to each traffic instance of the one or more traffic instances.

11. The apparatus of claim 10, wherein the instance identifier assigned to each traffic instance distinguishes each traffic instance from other traffic instances of the video stream; and wherein the priority value assigned to the video stream is indicative of a relative priority level associated with the video stream.

12. The apparatus of claim 9, wherein to reserve the amount of network bandwidth comprises to send the actual data rate value and the packet size value over the network path to allocate the amount of network bandwidth before sending one or more data units of size equaling the packet size value at the actual data rate value.

13. A network device comprising:

a chipset to couple a processor, one or more input-output devices, a network interface card, and a memory;

the processor to: (i) receive session values for one or more application level parameters of a video stream generated by an application to which differentiated services are provided, wherein the session values define a codec type, the frame rate, a resolution, a color depth, and a content type of the video stream, (ii) determine an experimental data rate value based on experimental data available for a pre-determined codec type operating at a specific frame rate, resolution, and color depth, (iii) determine a compression ratio based on the experimental data rate value, (iv) determine an actual data rate value based on the compression ratio and the session values of the video stream defining the codec type, the frame rate, the resolution, the color depth, and the content type of the video stream, and (v) determine a packet size value based on the actual data rate value and the frame rate;

the network interface card to reserve an amount of network bandwidth of a wireless network path to transfer data units of the video stream on the wireless network path, wherein the amount of bandwidth reserved is determined based on the actual data rate value and the packet size value; and the memory to store the session values, the actual data rate value, the packet size value, and instructions to generate the actual data rate value and the packet size value.

14. The network device of claim 13, wherein the network interface card is to couple the network device to an access point, wherein the network device and the access point are coupled wirelessly and the network device sends one or more packets to enable the access point to enable the amount of network bandwidth of the wireless network path to be reserved.

15. The network device of claim 13, wherein the network device is a laptop computer.

16. The network device of claim 13, wherein the network device is a hand-held device.

* * * * *